Figure 1:
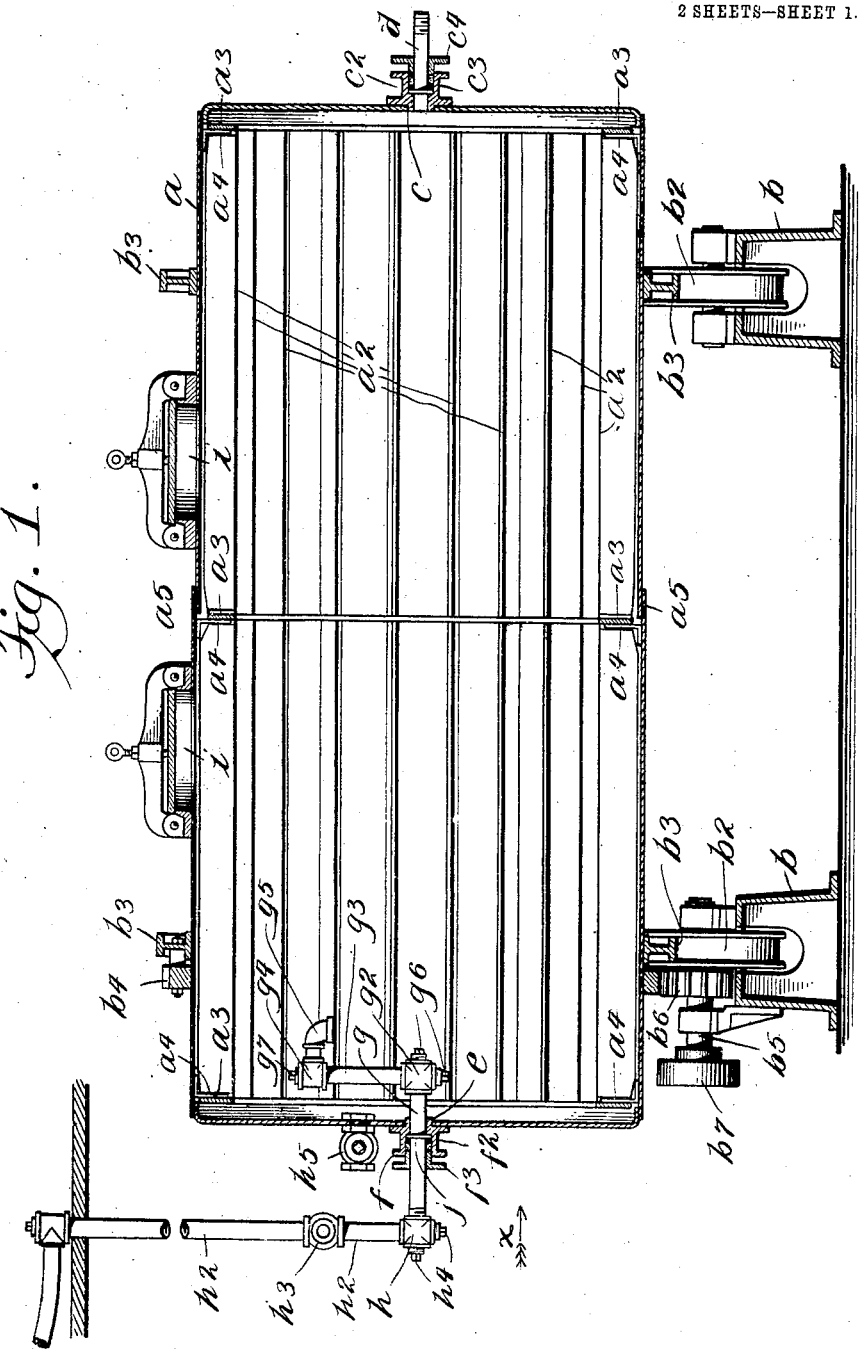

No. 854,526. PATENTED MAY 21, 1907.
T. D. PITTS.
APPARATUS FOR TREATING ORES.
APPLICATION FILED AUG. 15, 1904.

2 SHEETS—SHEET 1.

WITNESSES

INVENTOR
Thomas D. Pitts
BY Edgar Tate & Co., ATTORNEYS.

THE NORRIS PETERS CO., WASHINGTON, D. C.

No. 854,526. PATENTED MAY 21, 1907.
T. D. PITTS.
APPARATUS FOR TREATING ORES.
APPLICATION FILED AUG. 15, 1904.

2 SHEETS—SHEET 2.

WITNESSES

INVENTOR
Thomas D. Pitts
BY Edgar Tate & Co. ATTORNEYS.

UNITED STATES PATENT OFFICE.

THOMAS D. PITTS, OF NEW YORK, N. Y., ASSIGNOR TO THE NEW CYANIDE PROCESS COMPANY, OF NEW YORK, N. Y., A CORPORATION OF NEW YORK.

APPARATUS FOR TREATING ORES.

No. 854,526.  Specification of Letters Patent.  Patented May 21, 1907.

Application filed August 15, 1904. Serial No. 220,723.

*To all whom it may concern:*

Be it known that I, THOMAS D. PITTS, a citizen of the United States, residing at New York, in the county of New York and State of New York, have invented certain new and useful Improvements in Apparatus for Treating Ores, of which the following is a specification, such as will enable those skilled in the art to which it appertains to make and use the same.

This invention relates particularly to apparatus for use in the extraction of gold and silver from ores, concentrates, slimes, and tailings by what is known as the cyanid process in which cyanid of potassium or other chemicals are employed and involving a rotary leaching cylindrical casing or barrel; and the object of this invention is to provide an apparatus of the class specified, which is simple in construction and effective in operation and whereby the salts of base metals or other hindering substances may be more effectually removed, and the drawing off of the hydrogen and hydrocyanic fumes from the leaching cylinder or barrel and replacing the same with oxygen and a fresh cyanid of potassium or other solvent cyanogen compound solution in the form of a spray may be easily effected, so as to provide means for breaking up relatively impenetrable lumps of slime, and thereby bringing about a more perfect leaching of the gold and silver and a more perfect separation thereof from the ores, concentrates, slime and the like.

This invention is an improvement on that described and claimed in United States Letters Patent No. 710495 granted on the application of Sidney T. Muffly October 7, 1902, and is fully disclosed in the following specification, of which the accompanying drawing forms a part, in which the separate parts of the invention are designated by suitable reference characters in each of the views, and in which;—

Figure 2:
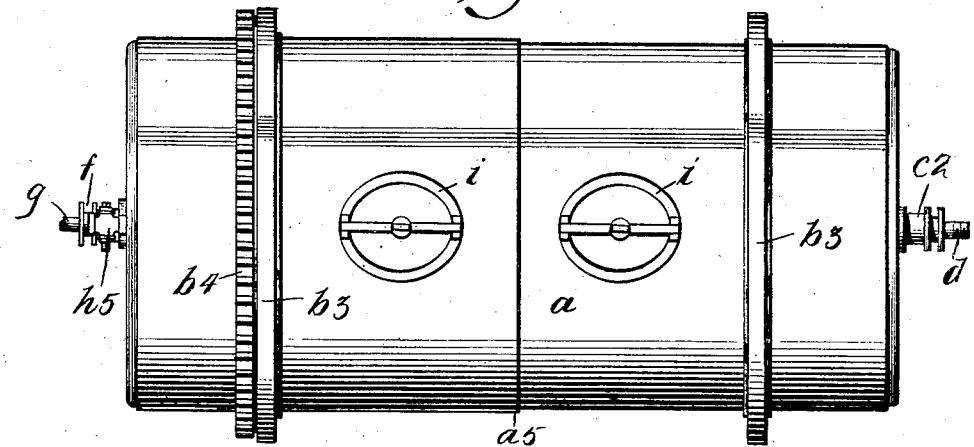

Figure 1 is a longitudinal vertical section of an apparatus embodying my invention; Fig. 2 a plan view thereof; and, Fig. 3 a sectional end view thereof looking in the direction of the arrow $x$ of Fig. 1.

In the practice of my invention I provide a casing or barrel $a$ which in the construction shown is cylindrical in form and which may be composed of any desired material, and the inner walls of which are provided with a plurality of radially arranged blades $a^2$ which constitute baffles or breakers which serve in the operation of the apparatus to agitate, break up and distribute the chemicals, ores, concentrates, slime and the like within said casing or barrel.

Figure 3:
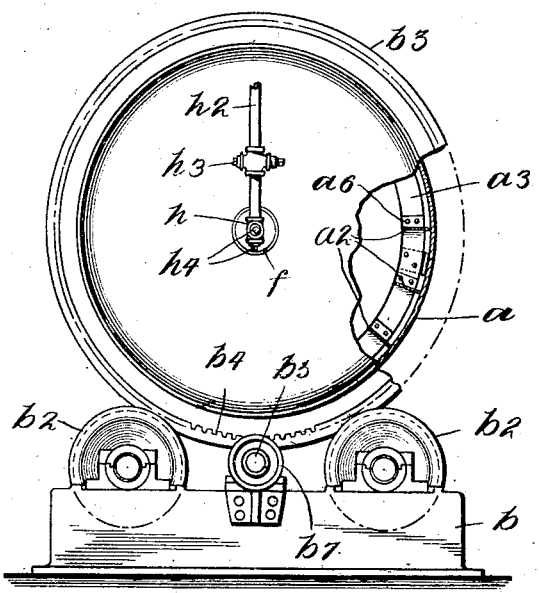

The baffle plates $a^2$ are arranged at regular intervals, and in the form of construction shown eighteen of the same are employed, and these plates are secured to annular bands or rings $a^3$ which are secured to the inner walls of the casing or barrel $a$ by means of angular brackets or similar devices $a^4$, and in the form of construction shown three of the rings or bands $a^3$ are employed, and each of the baffle plates $a^2$ is composed of two parts being divided by the central ring or band $a^3$, and in the form of construction shown, the casing or barrel $a$ is also composed of separate parts united centrally as shown at $a^5$, this connection, in the form of construction shown, being made by telescoping one part into the other, and it will be understood that the separate parts of the casing or barrel $a$ are riveted together at $a^5$, and the rings or bands $a^3$ are riveted to the angular brackets $a^4$ which in turn are riveted to the walls of the casing or barrel $a$, the method of riveting the baffle plates $a^2$ to the rings or bands $a^3$ being shown at $a^6$ in Fig. 3.

The casing or barrel $a$ is provided near its opposite ends with supports $b$ in which are mounted grooved wheels $b^2$, and said casing or barrel is provided with annular bands $b^3$ forming annular tracks which fit in and travel in the grooves in the wheels $b^2$, and said annular bands or tracks $b^3$ in the form of construction shown are similar in cross section to the cross section of an I-beam, and secured to one of said bands or tracks $b^3$ is an annular gear $b^4$ and arranged centrally of one of the supports $b$ is a shaft $b^5$ provided at one end with a gear wheel $b^6$ which operates in connection with the annular gear $b^4$, and the shaft $b^5$ is provided at its other end with a belt or power wheel $b^7$ and the casing or barrel $a$ may, by means of this construction, be rotated in either direction as will be readily understood.

The casing or barrel $a$ is provided at the right hand end thereof, in the form of construction shown, and centrally of said end with an opening $c$ in which is secured a stuffing box $c^2$ composed of the parts $c^3$ and $c^4$, and a stationary pipe $d$ is inserted into the stuffing box $c$, and this pipe $d$, in practice, serves as a conduit for admitting hot air and a cyanid of potassium solution, the same as in the patent hereinbefore referred to.

The opposite end of the casing or barrel $a$ or the left hand end thereof, in the form of construction shown, is also provided with an opening $e$ in which is secured a stuffing box $f$ composed, as usual, of two parts $f^2$ and $f^3$ and secured in the stuffing box $f$ is a pipe $g$ the inner end of which is provided with a four-way coupling $g^2$ with which is connected a vertically arranged pipe $g^3$ the upper end of which is provided with a three-way coupling $g^4$ having an inwardly and downwardly curved goose neck or elbow attachment $g^5$, and the bottom and inner sides of the four-way coupling $g^2$ are closed by screw-threaded plugs $g^6$, while the top side of the three-way coupling $g^4$ is closed by a similar plug $g^7$.

The outer end of the pipe $g$ is provided with a four-way coupling $h$ with the top side of which is connected a discharge pipe $h^2$ having a pressure regulating valve $h^3$ of any preferred construction, and the bottom and outer sides of the four-way coupling $h$ are closed by screw-threaded plugs $h^4$.

One end of the casing or barrel $a$ is provided with draw off valves $h^5$ one of which is shown, and these valves are intended for drawing off samples of the contents of the barrel or casing so as to make tests.

The casing or barrel $a$ is also provided in the form of construction shown, and in the top thereof, with two manholes or openings $i$ closed in the usual or any preferred manner, and these openings serve as means for the insertion or passing into the casing or barrel, of ores, concentrates, slime and the like, and any chemicals mingled therewith.

In the operation of this apparatus the casing or barrel $a$ is constantly rotated on its supports and the tubes $d$ and $g$ are held stationary and any suitable means may be provided for strengthening, bracing or supporting said tubes, and it will be understood that the pipe $g$ and the parts connected therewith are held stationary in the casing or barrel and the upright pipe $g^3$ is always held in an upright position and the elbow or goose neck attachment $g^5$ is directed downwardly. The pipe $g$ is also provided with a flange or collar $j$ within the stuffing box $f$ which facilitates the closing of said box or the making of a tight coupling or connection between said box and said pipe.

The operation of this apparatus will be readily understood from the foregoing description when taken in connection with the accompanying drawings and the following statement, and the advantages of my invention will be manifest to all who are conversant with devices of this character. The ores, concentrates, slime and the like, together with a small portion of a weak solution (preferably a one-quarter-of-one-percent. solution) of cyanid of potassium and only sufficient in amount to saturate the ores, are passed into the casing or barrel through the opening or openings $i$. These openings may be simply formed similar to those shown in the drawing, or they may be similar to that shown and described in the United States patent hereinbefore referred to. Power is then applied to rotate the casing or barrel $a$, and the effective leaching of the ores commences. As this operation continues, air of the most efficient temperature and a fresh solution of the same or any other desired strength, according to the character of the ore under treatment, is forced through the pipe $d$ into the casing or barrel in the form of spray or otherwise. Air may be forced in alone, either hot or cold, and its amount and force may be governed in any desired way by suitable regulating valves as in the patent hereinbefore referred to, and the admission of the cyanid solution with said air may also be regulated in any desired way or as in the patent hereinbefore referred to, and in this way the forcing of air and cyanid solution into the casing or barrel may be regulated to any desired extent. In this operation the air may also be heated to any desired extent and the extent of the heating of the air will depend on the character of the ores and other material to be treated. This injection of air and cyanid solution into the casing or barrel $a$ coincidently with the rotation or revolution of said casing or barrel serves a plurality of purposes. It provides a more effectual and economical supply of oxygen. It creates and maintains the most effective and the most constant temperature. It instantaneously adds fresh cyanid of potassium or other solvent in the form of spray continuously. It forces the oxygen and also the solution into and between all the parts of the ore-charge within the casing or barrel during any special time or during the entire time, according to the character of the ores operated upon. It supplies oxygen to replace that element as rapidly as it separates from the cyanogen compound to enter into new molecular combination with gold, silver and potassium. It also regenerates or strengthens the solution with a constant supply of the solvent compound, thereby preventing chemical inertia by replacing cyanogen which has combined with hydrogen liberated in the passing over of oxygen to form the new compounds—auro-potassic cyanid, argento-potassic cyanid, and potassic hydrate. Moreover, a systemic agitation is produced of the ores, concentrates and the like within the casing or barrel as the latter is rotated, said ores, concentrates or the like being carried up by the baffle plates $a^2$ and caused to fall by gravity through said casing or barrel at different angles and from different points and thus mingle with the warm currents of the air and the spray of solution which continuously enters the casing or barrel, and this systematic agitation, besides supplying oxygen to replace that element as it is needed in the cyanogen compounds, also serves for another purpose, namely that of removing films of insoluble basic oxids from the surface of coarse gold thereby rendering it more immediately amenable to the chemical treatment.

In the foregoing operation the poisonous hydrocyanic fumes generated from the excess of hydrogen and cyanogen liberated by the combination of the oxygen with gold, silver and potassium are carried off through the pipes $g$, $g^3$ and $h^2$ to any desired point, and these pipes being held stationary as hereinbefore described, the elbow or goose neck connection $g^5$ is always in the best position to receive said fumes and to discharge the same through the pipes $g$, $g^3$ and $h^2$, and in this operation the pressure within the casing or barrel $a$ is regulated by the pressure valve $h^3$.

The agitation of the ores, concentrates and the like by the baffle plates $a^2$ also breaks up and thoroughly disintegrates the vitrified lumps occurring in ores, concentrates and the like from imperfect roasting and likewise wears away impenetrable masses of slime, thereby bringing the gold and silver more readily in contact with the cyanid of potassium or other chemicals. Except as herein specifically described the operation of this apparatus will be or may be the same as that shown and described in the Letters Patent hereinbefore referred to.

In the operation of this apparatus the pipes $g$ and $g^3$ and the couplings connected with said pipes are apt to become clogged or closed by substances collecting therein, and the object of using the four-way couplings $h$ and $g^2$ and the three-way coupling $g^4$ is to provide means whereby these pipes and said couplings may be easily cleaned when necessary.

Having fully described my invention, what I claim as new and desire to secure by Letters Patent, is;—

In an apparatus of the class described, a rotatable casing or barrel the inner walls of which are provided at intervals with annular plates or rings, the inner walls of said casing or barrel being also provided with radially arranged baffle plates secured to said annular plates or rings, a stationary inlet pipe connected centrally with one end of said casing or barrel and a stationary outlet pipe passing centrally through the other end of said casing or barrel, and the inner end of which is provided with an upwardly directed member which opens into said casing or barrel, substantially as shown and described.

In testimony that I claim the foregoing as my invention I have signed my name in presence of the subscribing witnesses this 12th day of August 1904.

THOMAS D. PITTS.

Witnesses:
J. CHRIS LARSEN,
F. A. STEWART.